US012316020B2

(12) United States Patent
Park et al.

(10) Patent No.: US 12,316,020 B2
(45) Date of Patent: May 27, 2025

(54) ACTIVE PHASED ARRAY ANTENNA

(71) Applicant: MUTRONICS CO., LTD, Anseong-si (KR)

(72) Inventors: Seung-Mo Park, Yongin-si (KR); Soon Woo Choi, Pyeongtaek-si (KR)

(73) Assignee: MUTRONICS CO., LTD, Anseong-si (KR)

( * ) Notice: Subject to any disclaimer, the term of this patent is extended or adjusted under 35 U.S.C. 154(b) by 483 days.

(21) Appl. No.: 17/950,534

(22) Filed: Sep. 22, 2022

(65) Prior Publication Data

US 2023/0327335 A1 Oct. 12, 2023

(30) Foreign Application Priority Data

Mar. 28, 2022 (KR) ........................ 10-2022-0037751

(51) Int. Cl.
*H01Q 3/36* (2006.01)
*H01Q 5/40* (2015.01)

(52) U.S. Cl.
CPC ................. *H01Q 3/36* (2013.01); *H01Q 5/40* (2015.01)

(58) Field of Classification Search
CPC .. H01Q 3/36; H01Q 5/40; H01Q 5/52; H01Q 5/378; H01Q 19/005; H01Q 21/064; H01Q 21/065; H01Q 21/24; H01Q 21/061
See application file for complete search history.

(56) References Cited

U.S. PATENT DOCUMENTS 11,205,858 B1 * 12/2021 Durbin ..................... H01Q 3/28
11,211,702 B1 * 12/2021 Mahanfar ................ H01Q 5/42
11,532,884 B1 * 12/2022 Coutts ..................... H01Q 1/243
11,575,204 B1 * 2/2023 Veysoglu ................. H01Q 3/34
12,021,308 B2 * 6/2024 Park .......................... H01Q 5/40
2016/0087339 A1 * 3/2016 Bull ....................... H04W 16/28 342/367
2017/0012363 A1 * 1/2017 Zou ....................... H01Q 21/061
2018/0069605 A1 * 3/2018 Gharavi .................... H01Q 3/36
2019/0036231 A1 * 1/2019 Ryu ..................... H01Q 25/001
2021/0050671 A1 * 2/2021 Stevenson .......... H01Q 21/0087
2021/0135353 A1 * 5/2021 Socher ..................... G01S 13/02
2021/0143548 A1 * 5/2021 Chivukula ............... H01Q 1/48
2023/0299475 A1 * 9/2023 Reda ...................... H04L 5/1461
2023/0307850 A1 * 9/2023 Park ..................... H01Q 21/065

FOREIGN PATENT DOCUMENTS

KR 10-2007-0108858 11/2007
KR 10-2014-0112446 9/2014
KR 10-1489577 2/2015

* cited by examiner

*Primary Examiner* — Seokjin Kim
(74) *Attorney, Agent, or Firm* — KILE PARK REED & HOUTTEMAN PLLC

(57) ABSTRACT

The disclosure relates to an active phased array antenna capable of realizing dual-band and dual polarization. The active phased array antenna is divided into a transmission and reception domain, which has a rectangular shape and in which transmission antenna elements and reception antenna elements are enabled, and a reception domain, which has a rectangular shape and is disposed outside the transmission and reception domain and in which the transmission antenna elements are disabled and the transmission antenna elements are enabled so that one substrate is allowed to simultaneously perform transmission and reception functions, thereby reducing the size of the antenna, and furthermore, improving polarization characteristics and tilt characteristics in a broad band.

8 Claims, 7 Drawing Sheets

ACTIVE PHASED ARRAY ANTENNA

CROSS REFERENCE TO RELATED APPLICATION(S)

This application claims priority to and benefits of Korean Patent Application No. 10-2022-0037751 under 35 U.S.C. § 119, filed on Mar. 28, 2022 in the Korean Intellectual Property Office (KIPO), the entire contents of which are incorporated herein by reference.

1. TECHNICAL FIELD

The document relates to an active phased array antenna mainly used for satellite communication, and more particularly, to a technique of integrating and mounting transmission antenna elements and reception antenna elements into one substrate, and arranging and operating antenna elements so that dual band and dual polarization are performed.

2. DESCRIPTION OF THE RELATED ART

Recently, an antenna technique, which shifts a phase by actively controlling the phase using antenna elements, has been developed, and with a trend of miniaturization of electronic communication devices, a need for miniaturization of antennas mounted on the electronic communication devices is also increasing. In particular, antennas for satellite communication used in aircraft, unmanned aerial vehicles, vehicles, ships, and the like are generally different in a transmission frequency band and a reception frequency band, and accordingly, a transmission antenna and a reception antenna must be individually configured, and thus, there is a problem in that an overall antenna volume or size is increased because the transmission antenna and the reception antenna are configured as individual substrates (e.g., printed circuit boards (PCBs)). Even when the transmission antenna and the reception antenna are disposed on one substrate or one radiation aperture, there are still problems to be improved in polarization characteristics and wide-range electric beam tilt characteristics by appropriately maintaining an interval.

Korean Patent Publication (Publication No. 10-1489577, "DUAL-BAND GPS ANTENNAS FOR CRPA ARRARY") discloses a technique that increases radiation gain and minimizes pattern distortion by circularly arranging single antenna elements, each of which includes a first radiation patch configured to receive power from a power feeding patch through an electromagnetic field and a second radiation patch that is disposed to be spaced apart from the power feeding patch on a side opposite to a side in which the first radiation patch is disposed and configured to receive power from the power feeding patch, on the same substrate but has a limitation in performing wide-range tilt operations while minimizing interference between the antenna elements.

SUMMARY

The disclosure relates to a dual-band dual-polarization active phased array antenna, and is directed to minimizing a size of an array antenna and simultaneously improving polarization characteristics and beam tilt characteristics.

An aspect of the disclosure provides an active phased array antenna including a substrate, an antenna array in which transmission antenna elements each having a rectangular shape and reception antenna elements each having a rectangular shape are arranged in alternation in a matrix on the substrate, and a transmission and reception circuit unit including a transmission circuit and an reception circuit and enabling at least one transmission antenna element and at least one reception antenna element by power feeding, wherein the antenna array is divided into a transmission and reception domain, which has a rectangular shape and in which the transmission antenna elements and the reception antenna elements are enabled, and an reception domain, which has a rectangular shape and is disposed outside the transmission and reception domain and in which the transmission antenna elements are disabled and the reception antenna elements are enabled, and the transmission antenna element and the reception antenna element are disposed to be slanted at an angle of about 450 with respect to each other.

According to the disclosure, a size of an array antenna can be minimized, and simultaneously dual-band and dual-polarization characteristics can be improved. In addition, wide-range beam tilt characteristics can be improved to have an azimuth angle of about +/−70° and an elevation angle of about +/−70°.

DETAILED DESCRIPTION OF THE EMBODIMENTS

Figure 1:
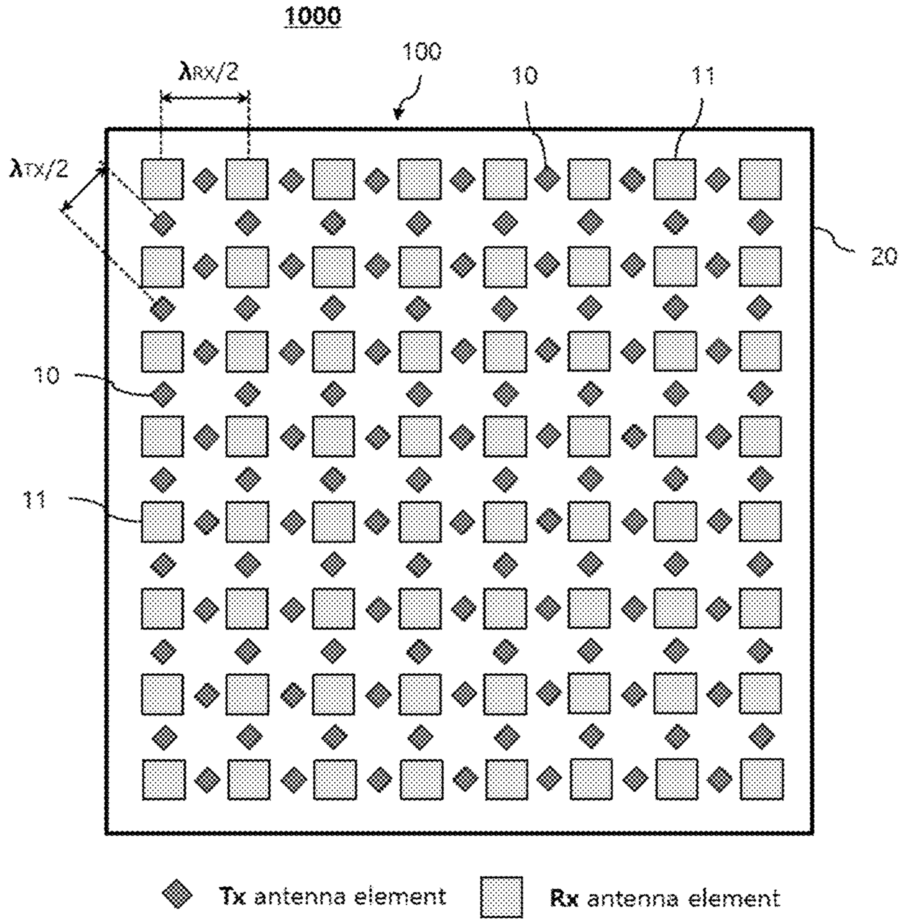
FIG. 1 is a schematic view for describing an arrangement structure of an active phased array antenna including an antenna array according to an embodiment.

Hereinafter, the disclosure will be described in detail so that those skilled in the art can easily understand and reproduce the disclosure through the embodiments described with reference to the accompanying drawings. In the following description of the disclosure, when it is determined that detailed descriptions of related well-known functions or configurations unnecessarily obscure the gist of the embodiments of the disclosure, the detailed descriptions thereof will be omitted. Since terms used throughout the specification are defined in consideration of functions in the embodiments of the disclosure and may be sufficiently modified according to the intentions of the user or operator and customs, such terms should be defined on the basis of contents throughout the specification.

Further, the foregoing and additional aspects of the invention will be apparent through the following embodiments. While the configurations of the selectively described aspects or selectively described herein are shown in a single integrated configuration in the drawings, it is understood that they may be freely combined between each other as long as they are not technically inconsistent with common technical knowledge of those skilled in the art.

Therefore, the embodiments described herein and illustrated in the configuration of the disclosure are only the most preferred embodiments and are not representative of the full the technical spirit of the disclosure, and thus it should be understood that various equivalents and modifications may be substituted for them at the time of filing the application.

FIG. 1 is a schematic view for describing an arrangement structure of an active phased array antenna 1000 including an antenna array 100 according to an embodiment. The antenna array 100 may be a partial configuration of the active phased array antenna. As shown in the drawing, the antenna array 100 may include transmission (Tx) antenna elements 10, reception (Rx) antenna elements 11, and a substrate 20. The Tx antenna elements 10 and the Rx antenna elements 11 are mounted on the substrate 20.

Each of the Tx antenna elements 10 may be configured as an aperture coupled patch antenna, and each of the Rx antenna elements 11 may be configured as an aperture coupled slot antenna.

The substrate 20 may have a rectangular shape, and the Tx antenna elements 10 each having a rectangular shape and the Rx antenna elements 11 each having a rectangular shape may be arranged in rows and columns in a rectangular shape as a whole on the substrate 20 and may be arranged in an n*n array. FIG. 1 illustrates a 15×15 array. The entire antenna array 100 may be arranged in a rectangular shape.

FIG. 1 illustrates a dual-band arrangement structure by taking an embodiment in which the Rx antenna elements 11 arranged in an 8×8 array operate as an example.

The RX antenna element 11 may include a radiation slot (not shown) and thus may radiate electromagnetic waves. The Tx antenna element 10 and the Rx antenna element 11 may each be patterned by a copper foil on a dielectric film or a PCB, and may be excited by a resonance phenomenon caused by power feeding to perform a radiation function. The Tx antenna element and the Rx antenna element 11 may each have a rectangular shape, but the Rx antenna element 11 may be larger in size than the Tx antenna element 10.

The Tx antenna elements may be disposed at an interval of about 0.5 times a Tx signal wavelength $\lambda_{TX}$, and the Rx antenna elements may be disposed at an interval of about 0.5 times an Rx signal wavelength $\lambda_{RX}$.

In the antenna array 100, the of Tx antenna elements 10 and the Rx antenna elements 11 are alternatively disposed on the substrate 20 in a matrix.

The term "alternation" may mean that the Tx antenna elements 10 are arranged to be interleaved between the Rx antenna elements 11 arranged in a matrix with a constant pitch interval, or the Rx antenna elements 11 are arranged to be interleaved between the Tx antenna elements 10 arranged in a matrix with a constant pitch interval.

The Tx antenna elements 10 and the Rx antenna elements 11 may each have the same shape and size. This allows the active phased array antenna to maintain excellent polarization characteristics or tilt characteristics.

An external ground plane of the Tx antenna element 10 and a cross-shaped slot plane of the Rx antenna element 11 may be formed of a copper film pattern on a same plane (or a same layer) of the PCB substrate, and an internal rectangular radiation patch of the Tx antenna element 10 may be formed of a copper film pattern on a different layer at different height of the PCB substrate.

The active phased array antenna of FIG. 1 has a disadvantage in that the Tx antenna element (Tx radiation element) and the Rx antenna element (Rx radiation element) electromagnetically interfere with each other to reduce antenna performance. Since the Rx radiating element is larger in size than the Tx radiating element, characteristics of a Tx array antenna may be relatively further degraded. In order to improve this disadvantage, it is necessary to apply modified forms of antenna elements (radiation elements) with less mutual interference as shown in FIG. 2A to FIG. 2H.

FIG. 2A to FIG. 2H is a schematic set of views illustrating various forms of antenna elements constituting an antenna array according to an embodiment. The Tx antenna element 10 and the Rx antenna element 11 may each appropriately employ the antenna element (radiation element) shown in FIG. 2A to FIG. 2H according to used frequency bands and beam tilt angles.

Figure 2A:
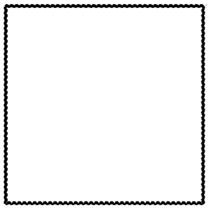
FIG. 2A to FIG. 2H is a schematic set of views illustrating various forms of antenna elements constituting an antenna array according to an embodiment.
Figure 2B:
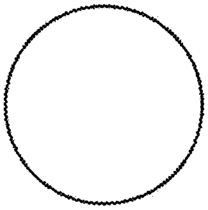
Figure 2C:
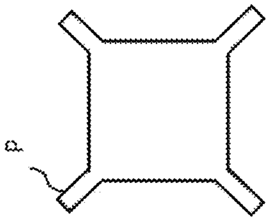
Figure 2D:
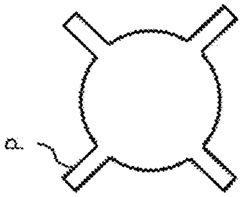
Figure 2E:
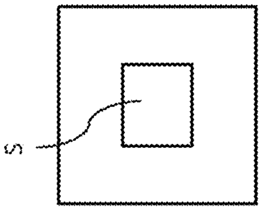
Figure 2F:
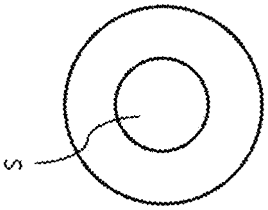
Figure 2G:
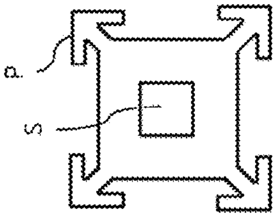
Figure 2H:
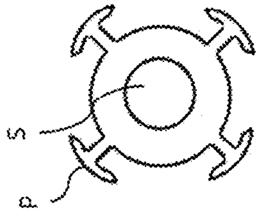

As shown in the drawing, FIGS. 2A and 2B illustrate antenna elements of a rectangular shape and a circular shape, respectively, FIGS. 2C and 2D illustrate antenna elements of a rectangular shape and a circular shape, respectively, of which an edge has a parasitic pattern P, FIGS. 2E and 2F illustrate antenna elements of a rectangular shape and a circular shape, respectively, of which a center has a slot S (empty space), and FIGS. 2G and 2H illustrate antenna elements of a rectangular shape and a circular shape, respectively, of which an edge has a different-shaped parasitic pattern P and a center has a slot S.

The antenna elements shown in FIGS. 2C to 2F have an effect of reducing a size and area than the antenna elements shown in FIGS. 2A and 2B, and thus, in case that the antenna array is configured using the antenna elements shown in FIGS. 2C to 2F, active return loss may be improved, thereby increasing an antenna gain.

Figure 3:
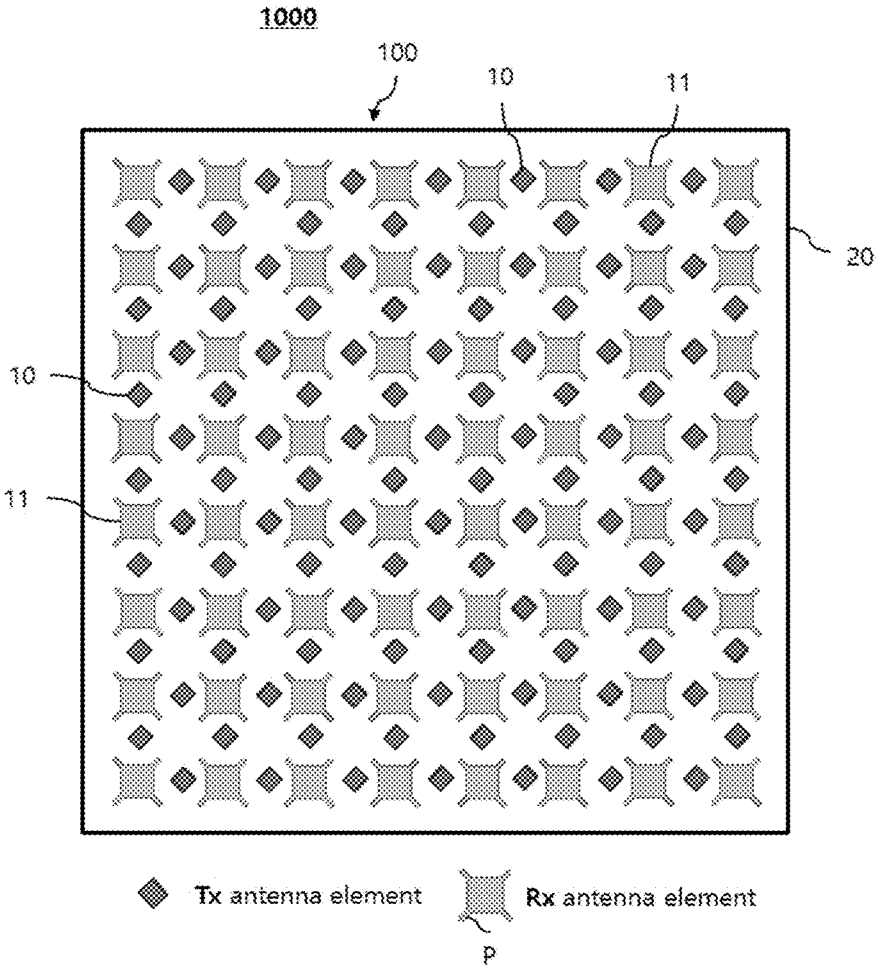
FIG. 3 is a schematic view for describing an active phased array antenna in which an antenna array is configured by replacing a reception antenna element illustrated in FIG. 1 with the antenna element illustrated in FIG. 2C.

FIG. 3 is a schematic view for describing the active phased array antenna 1000 in which an antenna array 100 is configured by replacing the Rx antenna element illustrated in FIG. 1 with the antenna element illustrated in FIG. 2C. Since the rectangular Rx antenna element having a bar-shaped parasitic pattern P at a corner thereof is applied to the antenna array shown in FIG. 3, active reflection loss of an Rx antenna element 11 may be further reduced, so that gain and beam tilt characteristics of the Tx antenna element 10 may be improved. The parasitic pattern may be provided at the corner of the Rx antenna element. Four parasitic patterns may be symmetrically provided.

Figure 4:
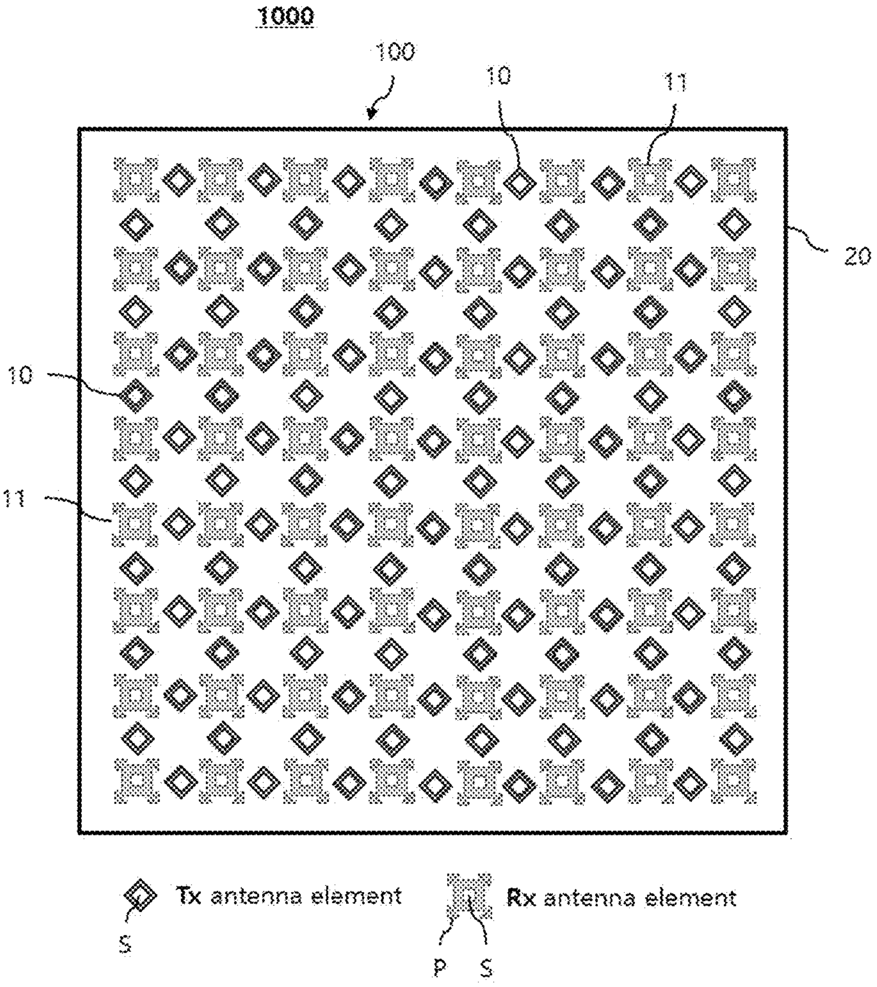
FIG. 4 is a schematic view for describing an active phased array antenna in which an antenna array is configured by replacing a transmission antenna element and the reception antenna element illustrated in FIG. 1 with the antenna elements illustrated in FIGS. 2E and 2G.

FIG. 4 is a schematic view for describing the active phased array antenna 1000 in which an antenna array 100 is configured by replacing the Tx antenna element and the Rx antenna element illustrated in FIG. 1 with the antenna elements illustrated in FIGS. 2E and 2G. Since the rectangular Rx antenna element having an arrow-shaped parasitic pattern P at a corner thereof and the slot S at the center thereof is applied to the antenna array shown in FIG. 4, active reflection loss of each of the Tx antenna element 10 and the Rx antenna element 11 may be reduced, so that gain and beam tilt characteristics of each of the Tx and Rx antenna elements may be all improved.

Figure 5:
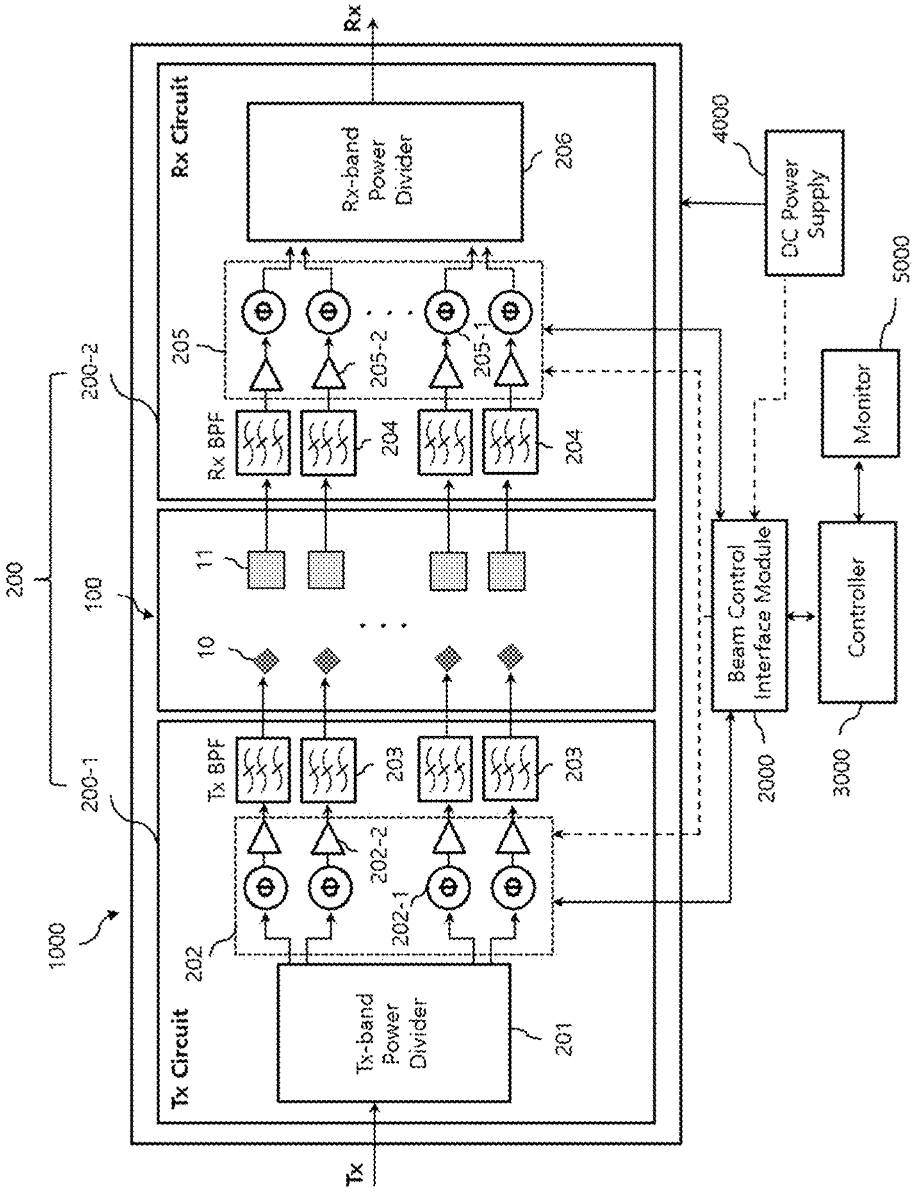
FIG. 5 is a schematic view for describing transmission and reception operation domains and an arrangement structure of the active phased array antenna of an 8×8 transmission/reception array according to an embodiment.

FIG. 5 is a schematic view for describing Tx and Rx operation areas and an arrangement structure of the active phased array antenna of an 8×8 Tx/Rx array according to an embodiment. As shown in the drawing, the active phased array antenna 1000 may include an antenna array 100 and a Tx and Rx circuit unit 200.

The Tx and Rx circuit unit 200 may be configured as a PCB and may be provided by being stacked below the antenna array 100.

The Tx and Rx circuit unit 200 may include a Tx circuit 200-1 and an Rx circuit 200-2, and may enable at least one Tx antenna element and at least one Rx antenna element by power feeding. The term "enable" may mean a state in which a radiation function is performed and thus transmission or reception is possible. As shown in the drawing, the Tx and Rx circuit unit 200 may be configured as an analog circuit, and may also be configured as a digital circuit.

In the Tx circuit 200-1, a Tx-band power divider 201 may receive a Tx signal, divide and transmit the Tx signal to a Tx phase shifting unit 202 including Tx phase shifters 202-1 and Tx amplifiers 202-2, and the phase-shifted signal is transmitted through Tx band-pass filters (BPFs) 203 so that Tx sensitivity may be improved. An output signal of the Tx BPF 203 may be transmitted to the Tx antenna element 10, and may excite a radiation patch antenna and may be transmitted. The transmittable state may mean an enabled state.

The Rx circuit 200-2 may include Rx BPFs 204, which receive a signal from the RX antenna element 11 to improve Rx sensitivity, an Rx phase shifting unit 205 including Rx phase shifters 205-1 and Rx amplifiers 205-2, and an Rx-band power divider 206. The Rx-band power divider 206 may divide the received signal and output (Rx) the received signal. The receivable state may mean an enabled state.

A beam control interface module 2000 configured to provide a phase shift control signal, a magnitude control signal, and power to the phase shifting units 202 and 205 and a controller 3000 configured to provide a control signal to the beam control interface module 2000 may be electrically connected to the active phased array antenna 1000, and furthermore, a direct current (DC) power supply 4000 and a monitor 5000 may be further connected to the active phased array antenna 1000. The DC power supply 4000 may supply (dotted-line arrows) DC power to the phase shifting units 202 and 205.

The active phased array antenna 1000 and the beam control interface module 2000 may be provided on one substrate to constitute an array antenna assembly.

Since the beam control interface module 2000 and the controller 3000 control phase shifting of the phase shifters 202-1 and 205-1, a beam tilt operation may be actively realized, selective switching between horizontal polarization and vertical polarization and between circular polarization and linear polarization may be realized, and circular polarization may also be selectively switched between left-hand circular polarization (LHCP) and right-hand circular polarization (RHCP).

Figure 6:
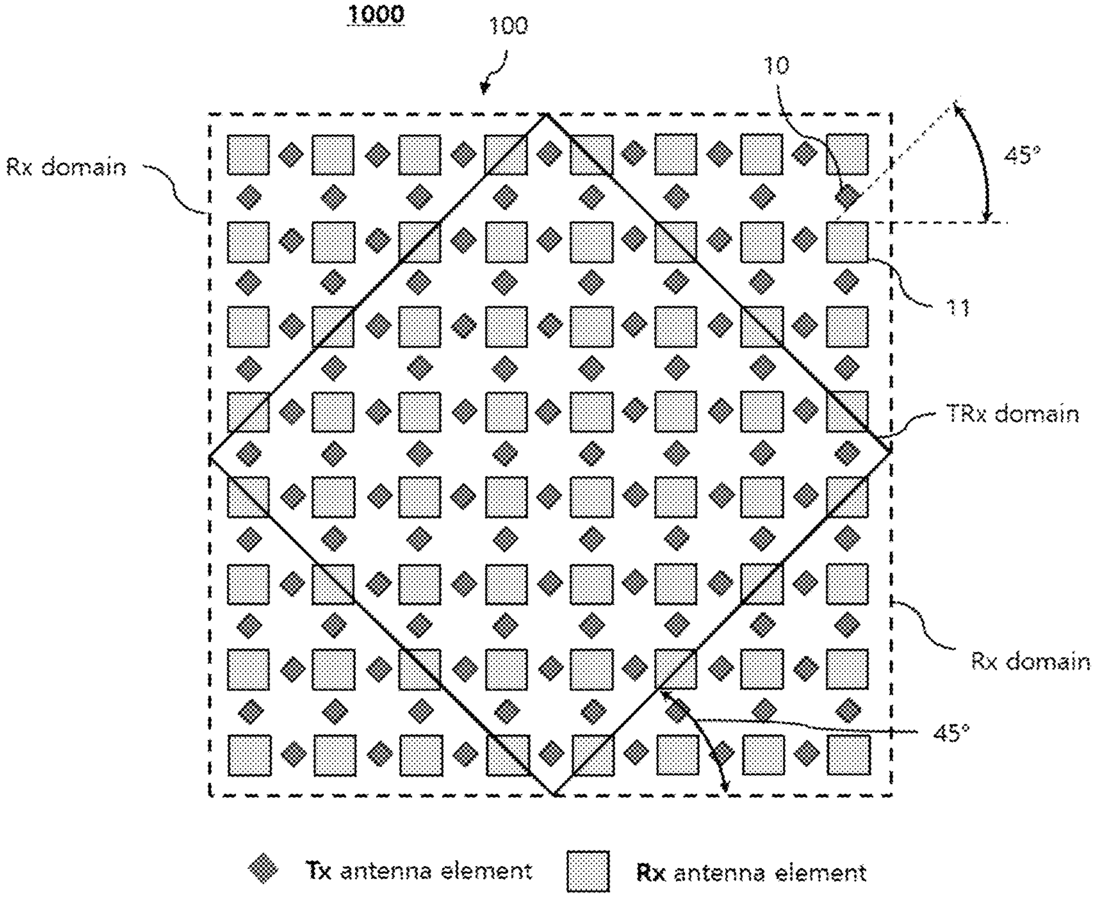
FIG. 6 is a schematic view for describing transmission and reception operation domains of the active phased array antenna according to an embodiment.

FIG. 6 is a schematic view for describing Tx and Rx operation domains of the active phased array antenna according to an embodiment. For convenience of description, the substrate 20 of FIG. 1 is omitted. As shown in the drawing, the active phased array antenna 1000 includes the antenna array 100, and the antenna array 100 may be divided into a TRx domain (solid-line area), which has a rectangular shape and in which the Tx antenna elements 10 each having a rectangular shape and the Rx antenna elements 11 each having a rectangular shape are enabled, and an Rx domain (dotted-line area), which has a rectangular shape and is disposed outside the TRx domain and in which the Tx antenna elements are disabled and the Rx antenna elements are enabled.

According to an embodiment, the Tx antenna element 10 and the Rx antenna element 11 may be disposed to be slanted at an angle of about 450 with respect to each other.

The TRx domain may be disposed inside the Rx domain. Thus, a size of the Rx domain may be larger than a size of the TRx domain. The TRx domain may be disposed inside the Rx domain. The term "inside" is not intended to mean a complete inside, and is typically a concept that includes a degree that may be usually regarded as being disposed inside.

All of the Tx antenna elements 10 may have the same shape and size, and all of the Rx antenna elements 11 may also have the same shape and size. Accordingly, excellent dual-band and dual-polarization characteristics may be achieved.

According to an embodiment, the Tx antenna elements 10 may transmit a high-frequency radio frequency (RF) signal, and the Rx antenna element 11 may receive a low-frequency RF signal. The radiation patch of the Tx antenna elements 10 may serve to transmit a high-frequency RF signal, and the radiation slot of the Rx antenna element 11 may serve to receive a low-frequency RF signal.

The high frequency may refer to a frequency range of about 26.5 to about 40 GHz (Ka band), and the low frequency may refer to a frequency range of about 17 to about 26.5 GHz (K band). The high frequency may be about $\sqrt{2}$ times the low frequency.

The Tx antenna elements may be disposed at an interval of about 0.5 times a high-frequency RF signal wavelength $\lambda_{TX}$, and the Rx antenna elements may be disposed at an interval of about 0.5 times a low-frequency RF signal wavelength $\lambda_{RX}$.

According to an embodiment, the Rx domain and the TRx domain may be disposed to be slanted at an angle of about 450 with respect to each other. Accordingly, inter-signal interference may be minimized, and polarization characteristics and tilt characteristics may be improved.

Figure 7:
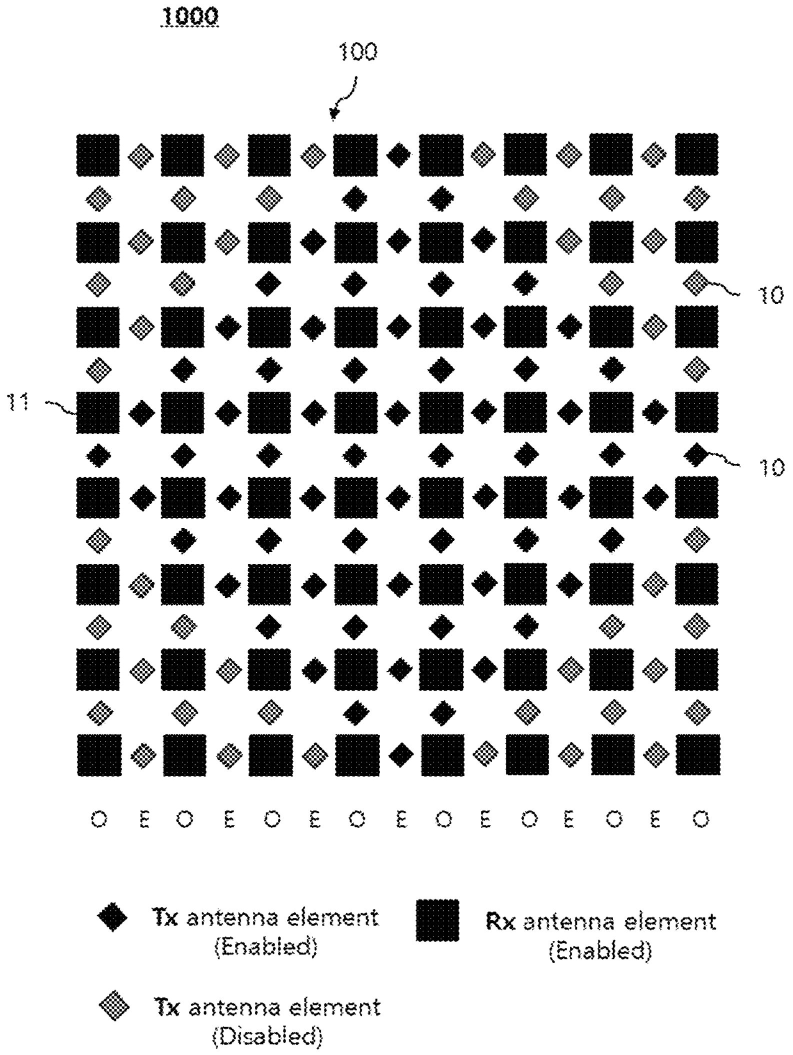
FIG. 7 is a schematic view for describing transmission and reception operation functions of the active phased array antenna of an 8×8 transmission/reception array according to an embodiment.

FIG. 7 is a schematic view for describing Tx and Rx operation functions of the active phased array antenna of an 8×8 Tx/Rx array according to an embodiment. In the active phased array antenna 1000, the Tx antenna elements 10 of an 8×8 array in the TRx domain may be enabled, and the Tx antenna elements 10 outside the TRx domain may be disabled.

In another example, for the Rx antenna elements 11, among the entire Rx antenna elements including the TRx domain and the Rx domain, the Rx antenna elements 11 of an 8×8 array located in odd columns O may be enabled and the Rx antenna elements 11 of a 7×7 array located in even columns E may be disabled.

The RX antenna elements 11 of a 7×7 array may be located in the even columns E as described above to allow all radiation elements to exhibit the same performance by ensuring that all enabled radiation elements have the same surrounding environment.

Such an enabling operation may be realized by the Tx and Rx circuit unit 200 of FIG. 5. The Tx antenna elements in the Rx domain may be disabled. The Rx antenna elements 11 in the Rx domain may all be enabled, and the Tx antenna elements 10 in the Rx domain may all be disabled.

In FIG. 7, the enabled Tx antenna elements are indicated by a dark color, and the disabled Tx antenna elements are indicated by a relatively light color. All of the Rx antennas are enabled and are indicated dark. The disabled Tx antenna elements may dummy antenna elements and may not be electrically connected to the Tx and Rx circuit unit 200 of FIG. 5.

According to an embodiment, the Tx antenna elements in the TRx domain are configured in a rectangular 8×8 array, and the Rx antenna elements in the Rx domain may be configured in a rectangular 8×8 array disposed to be slanted at an angle of about 45°.

It is to be understood that the embodiment described with reference to FIGS. 3 and 4 may be implemented by directly applying the TRx domain, the arrangement structure, and the operation function for each domain described with reference to FIGS. 6 and 7.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. An active phased array antenna comprising:

a substrate;

an antenna array in which transmission (Tx) antenna elements each having a rectangular shape and reception (Rx) antenna elements each having a rectangular shape are alternatively arranged in a matrix on the substrate; and a Tx and Rx circuit unit including a Tx circuit and an Rx circuit and enabling at least one Tx antenna element and at least one Rx antenna element by power feeding, wherein the antenna array is divided into a transmission and reception (TRx) domain, which has a rectangular shape and in which the Tx antenna elements and the Rx antenna elements are enabled, and an Rx domain, which has a rectangular shape and is disposed outside the TRx domain and in which the Tx antenna elements are disabled and the Rx antenna elements are enabled, and the Tx antenna element and the Rx antenna element are disposed to be slanted at an angle of about 45° with respect to each other.

2. The active phased array antenna of claim 1, wherein all of the Tx antenna elements have the same shape and size, and all of the Rx antenna elements have the same shape and size.

3. The active phased array antenna of claim 1, wherein the Tx antenna element transmits a high-frequency radio frequency (RF) signal, and the Rx antenna element receives a low-frequency RF signal.

4. The active phased array antenna of claim 1, wherein the TRx domain is disposed inside the Rx domain.

5. The active phased array antenna of claim 1, wherein the Rx domain and the TRx domain are disposed to be slanted at an angle of about 45° with respect to each other.

6. The active phased array antenna of claim 3, wherein the Tx antenna elements are disposed at an interval of about 0.5 times a high-frequency RF signal wavelength ($\lambda_{TX}$), and the Rx antenna elements are disposed at an interval of about 0.5 times a low-frequency RF signal wavelength ($\lambda_{RX}$).

7. The active phased array antenna of claim 1, wherein a parasitic pattern is provided at a corner of the Rx antenna element.

8. The active phased array antenna of claim 7, wherein four parasitic patterns are symmetrically provided.

* * * * *